United States Patent
McGrath et al.

(10) Patent No.: US 7,043,638 B2
(45) Date of Patent: May 9, 2006

(54) MATERIAL DISPLAY

(75) Inventors: Mark John McGrath, Bracknell (GB); Michael Williams, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 10/392,566

(22) Filed: Mar. 20, 2003

(65) Prior Publication Data
US 2003/0217273 A1    Nov. 20, 2003

(30) Foreign Application Priority Data
Mar. 22, 2002    (GB) .................................. 0206831.0

(51) Int. Cl.
  *H04L 9/00*    (2006.01)
  *H04H 7/16*    (2006.01)
  *H04N 5/91*    (2006.01)
  *H04N 7/00*    (2006.01)
(52) U.S. Cl. ............................ 713/176; 725/20; 386/46
(58) Field of Classification Search ................. 725/20, 725/95; 380/42; 713/176, 193, 194; 386/46, 386/125
See application file for complete search history.

(56) References Cited

U.S. PATENT DOCUMENTS

| | | | |
|---|---|---|---|
| 5,636,078 A * | 6/1997 | Tsai ........................... 360/72.1 |
| 6,166,496 A * | 12/2000 | Lys et al. ................... 315/316 |
| 2002/0016848 A1 * | 2/2002 | Yohsimine et al. |
| 2002/0078456 A1 * | 6/2002 | Hudson et al. |
| 2002/0124173 A1 * | 9/2002 | Stone |

FOREIGN PATENT DOCUMENTS

EP    1 069 722 A2    1/2001

* cited by examiner

*Primary Examiner*—Gregory Morse
*Assistant Examiner*—Peter Poltorak
(74) *Attorney, Agent, or Firm*—Oblon, Spivak, McClelland, Maier & Neustadt, P.C.

(57) ABSTRACT

The invention relates to a data storage medium storing data material having a data replay order, the stored data material being associated with dummy data material stored on the medium at a different position in the data replay order, in which metadata identifying the data material is encoded as a watermark in the dummy data material.

22 Claims, 5 Drawing Sheets

Basic and Extended UMID Structures
PRIOR ART

MATERIAL DISPLAY

BACKGROUND OF THE INVENTION

1. Field of the Invention

This invention relates to storing material. The material may be one or more of video material, audio material and data material.

2. Description of the Prior Art

Reference will be made in the following to video material for convenience. However the invention is not limited to video material. It may be applied to audio material. It may be applied to data material other than audio and video. It may be applied to material having one or more components selected from audio, video and data material.

It is known to identify video material by applying a "watermark" to the video signal. A watermark is a coded signal, which is combined with the video signal in such away that the coded signal is invisible or substantially invisible in the displayed image. The coded signal is detectable in the video signal: it is used for detecting infringement of copyright for example. However, watermarks may be damaged or removed deliberately or inadvertently by further processing of the material e.g. by editing or applying special effects. Also, there may be a perceived fear that applying a watermark may cause a deterioration, however small, in the video signal.

Recently it has also been recognised that associating so-called metadata with material can provide a powerful means of handling, indexing and using material. In GB-A-2 361 136 for example, the metadata is provided in a database, with entries in the database being linked to the material by means of a material identifier such as an SMPTE Unique Material Identifier (UMID). The UMID itself is coded into the material in a watermarking arrangement.

SUMMARY OF THE INVENTION

This invention provides a data storage medium storing data material having a data replay order, the stored data material being associated with dummy data material stored on the medium at a different position in the data replay order, in which metadata identifying the data material is encoded as a watermark in the dummy data material.

The invention allows metadata to be stored on the same recording medium as the associated material, without risking deterioration of the associated material. The invention is particularly applicable to tape media, but could also be applied to other types of linear media or to other media (such as a video disk) with an associated order of data replay. A portion of dummy data (e.g., in the case of stored video material, a portion of a test pattern, black and burst, text material etc) is stored on the storage medium, and the metadata is encoded as a watermark in the dummy data material.

Preferably the data material and the dummy data material are stored at substantially contiguous positions in the data replay order. For example, in the case of a tape medium this might mean different but substantially adjacent positions on the tape.

Preferably the metadata comprises at least a material identifying code. This can be particularly useful to link the metadata and/or the data material to external data sources or references. Also, in the preferred case that the data material is stored as data groups (e.g., in the case of video material, images such as frames or fields), each data group including a material identifying code associating that data group with metadata having a corresponding material identifying code, the material identifying code can link the data material to the watermarked metadata in the dummy material.

The dummy data may actually include a certain amount of useful data. For example, the dummy data may be titling data, shot lists or the like. It is possible to use dummy data which is itself alphanumeric data such as titling or shot lists, or a visual representation of alphanumeric data, and to embed in it further data by means of the watermark, where the further data could be the same alphanumeric data, related alphanumeric data or other data altogether. For example, the dummy data could be a visual representation of the outline of a list, such as a shot list, and the outline could be populated by data incorporated as a watermark.

Large amounts of payload data may be embedded in the dummy data using the present technique. This could allow some relaxation of the normally very stringent requirement that the watermark does not affect the picture over which it is imposed. In general, a watermark carrying a higher data payload is more visible than one carrying a smaller data payload. So, in the present embodiments, a watermark which is "poor" in the sense that its effects are quite visible could be used in order to allow a high data payload (e.g. a shot list) to be carried. By embedding the watermark data into the dummy data, damage to the other recorded data material is avoided.

Various other respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

The following description illustrates the invention by way of reference to video material. However, the invention is not limited to video material.

Overview

Figure 1:
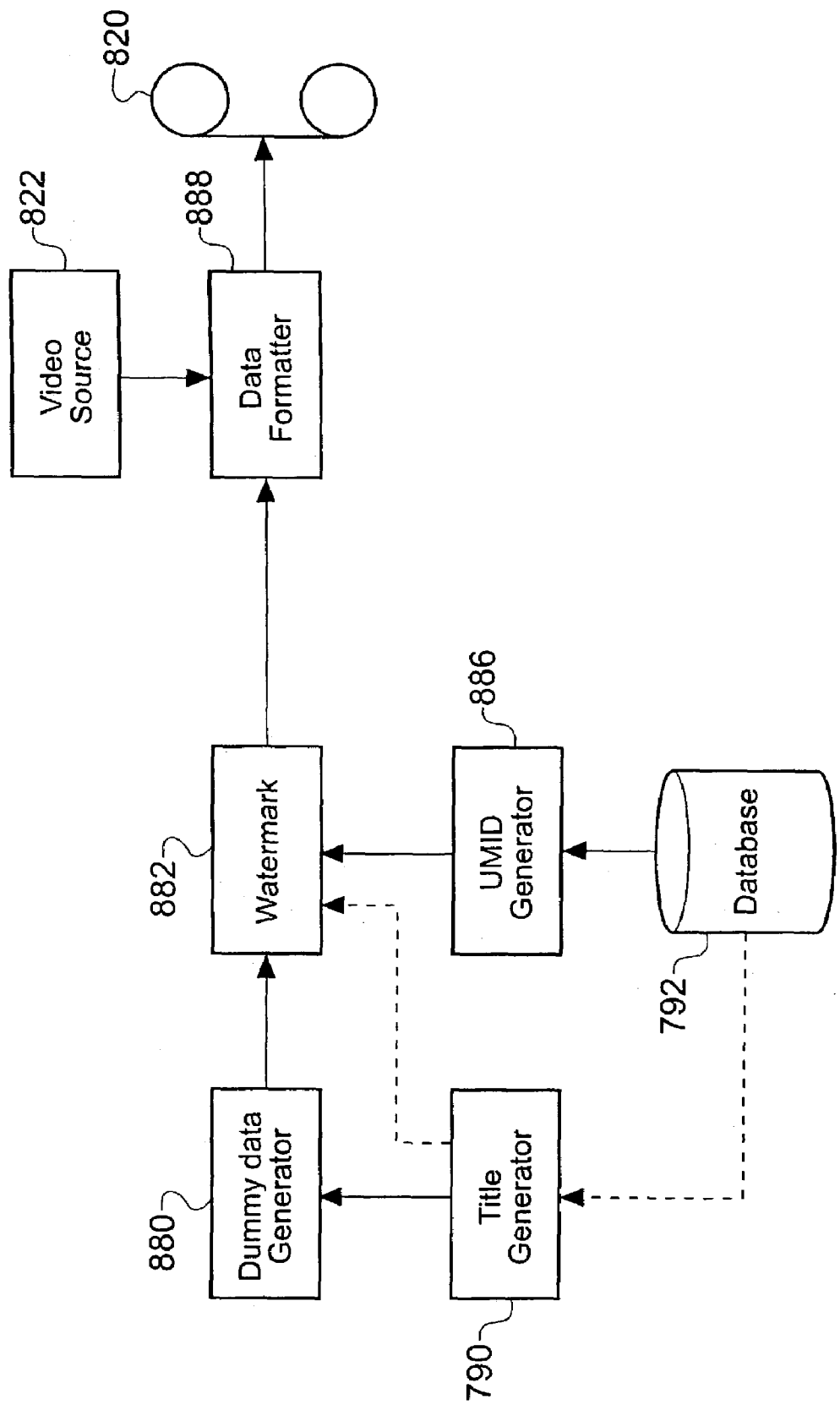
FIG. 1 is a schematic block diagram of a system in accordance with the invention.

Referring to FIG. 1, a dummy data generator 880 produces data material to be watermarked. The dummy data may be for example titling data, menu data, test signal data such as colour bars and the like, or simply data representing null material such as black video images. As an example, if titling data were to be used, a title generator 790, taking appropriate information from a database 792 (storing bibliographic details of the current video material) would generate a visual representation of alphanumeric titling information and supply this as dummy data to the dummy data generator (of course, in such a situation the dummy data generator could simply pass on the titling data as the dummy data.

A watermark is inserted into, or applied to, the dummy data material by a watermark generator 882. Watermarking is discussed in the section Watermarking below. In a preferred embodiment of the invention, the watermark is generated from a UMID. The UMID is generated by a UMID generator 886, taking data as required from the database 792. UMIDs are discussed in the section UMIDs below. Thus in the preferred embodiment, the watermark based on UMIDs identifies the material and may also identify the owner of the material. UMIDs can identify material to the accuracy of one frame. Thus in a preferred embodiment a watermark is in every frame uniquely identifying each frame. In another preferred embodiment, the instance number fields of the UMIDs are used as "fingerprints" to distinguish different authorised users of the material.

The watermarked dummy data material is supplied to a data formatter 888 which formats the material for recording onto a recording medium 820. The recording medium is one which has an associated replay order, such as a tape, an optical disc, a magnetic disc, a random access electronic memory arranged for material storage or the like. in fact, it is envisaged that any type of physical medium may be used for material storage in a replay order. Media such as DVDs, which may have a complex or multi-path replay order, are still considered to provide a material replay order.

The data formatter also receives video material from a video source 822. The source may be a camera, a Video Tape Recorder, a video server, or any other suitable source. The UMIDs generated by the UMID generator 886 are indicative of the content of the video material from the video source 822, not the content of the dummy data. In other words, apart from any functionality they may have such as providing menu, titling or test data, the dummy data serve in this regard merely as a transport medium for the UMIDs or other data carried by the watermark.

The data formatter interleaves (with respect to the replay order) the watermarked dummy data material with the video material from the video source 822. The interleaving can be carried out in many different ways, such as those to be described with references to FIGS. 2*a* to 2*c* below. The interleaved video data and watermarked dummy data are then recorded on the recording medium 820 in an appropriate replay order.

The database 792 may contain metadata relating to the material and linked to the material by the UMIDs. Examples of Metadata which may be contained in such a database are described in the section Metadata below.

The dummy data may actually include a certain amount of useful data. For example, the dummy data may be titling data, shot lists or the like. It is possible to use dummy data which is itself alphanumeric data such as titling or shot lists, or a visual representation of alphanumeric data, and to embed in it further data by means of the watermark, where the further data could be the same alphanumeric data, related alphanumeric data or other data altogether. For example, the dummy data could be a visual representation of the outline of a list, such as a shot list, and the outline could be populated by data incorporated as a watermark. For this reason, a dotted-line link is shown for data to pass directly from the title generator 790 to the watermark generator 882, so that titling data (or the like) may be embedded as part of the watermark.

Figure 2A:
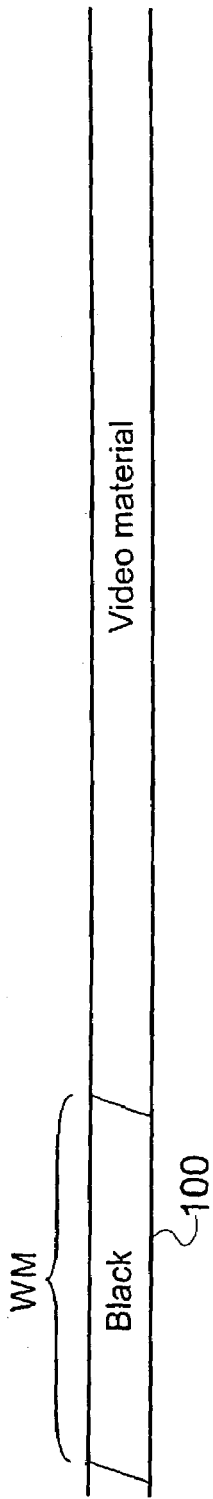
FIGS. 2*a*, 2*b* and 2*c* schematically illustrate possible arrangements of watermarked dummy data within recorded material.
Figure 2B:
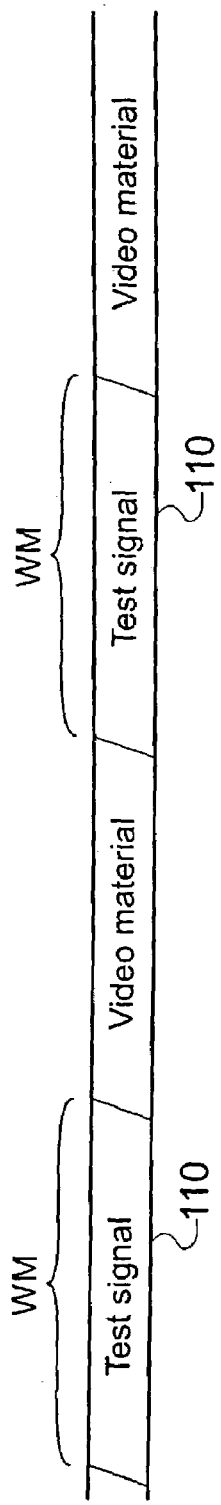
Figure 2C:
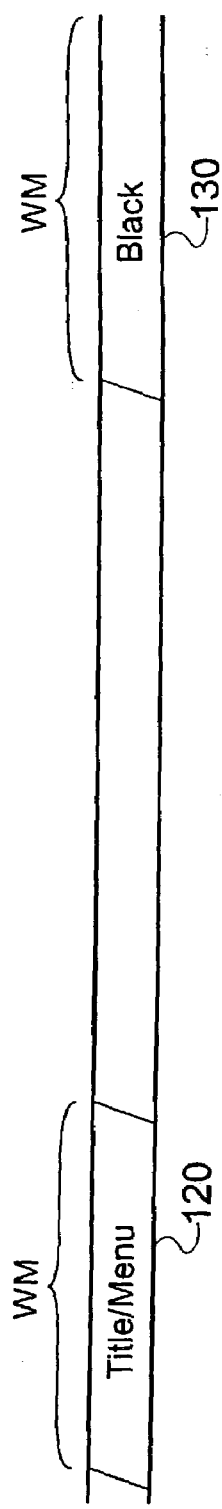

Large amounts of payload data may be embedded in the dummy data using the present technique. This could allow some relaxation of the normally very stringent requirement that the watermark does not affect the picture over which it is imposed. In general, a watermark carrying a higher data payload is more visible than one carrying a smaller data payload. So, in the present embodiments, a watermark which is "poor" in the sense that its effects are quite visible could be used in order to allow a high data payload (e.g. a shot list) to be carried. By embedding the watermark data into the dummy data, damage to the other recorded data material is avoided. FIGS. 2*a* to 2*c* schematically illustrate possible arrangements of watermarked dummy data within recorded material. It should be noted that these diagrams are not intended to represent a particular type of recording medium such as a tape medium. Instead, they simply represent a straightforward linear replay order from left to right across the page. Of course, as mentioned above, more complex or non-linear replay orders (such as those available using DVDs) may be used instead. The following description would apply equally to such arrangements, but is restricted to simple linear replay orders merely for clarity of the diagrams.

In FIGS. 2*a* to 2*c*, the label "WM" indicates portions of the recorded material which have been watermarked as described above.

Referring to FIG. 2*a*, it is an established technique not to use the first part of a tape medium to record valuable video material, because there is a higher risk of material loss or deterioration at extremes of a tape where the tape tension may be less finely controlled or the tape may be susceptible to damage. Accordingly, in FIG. 2*a* a black dummy signal portion 100 is recorded as the first item on the recording medium, with a watermark being applied to that portion 100.

In FIG. 2*b*, portions of a test signal 110 (such as colour bars or the like) are interleaved in the replay order with portions storing video material.

FIG. 2*c* illustrates two further (independent) possibilities, namely to include watermarked titling or menu data, for example at the start of the recorded material in the replay order, and to include a watermarked identifying portion 1.30 (e.g. black signal) at the end of the recorded material in the replay order. By placing this material at the end in the replay order, it need not interfere with normal replay and use of the video material but is available if needed for material identification purposes.

Figure 3:
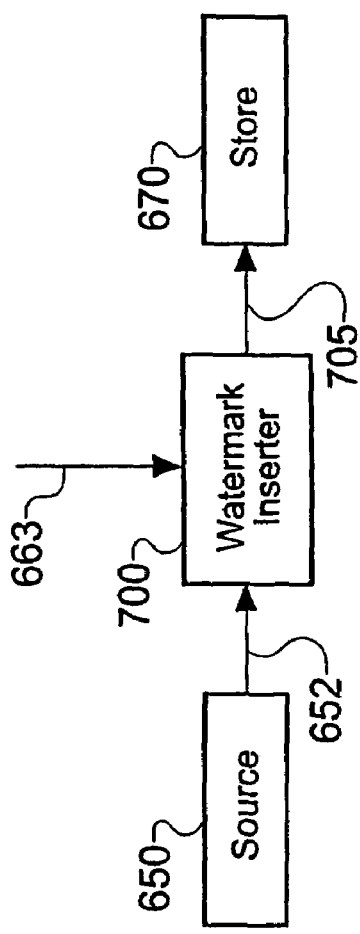
FIGS. 3 and 4 are schematic block diagrams of watermarking systems.
Figure 4:
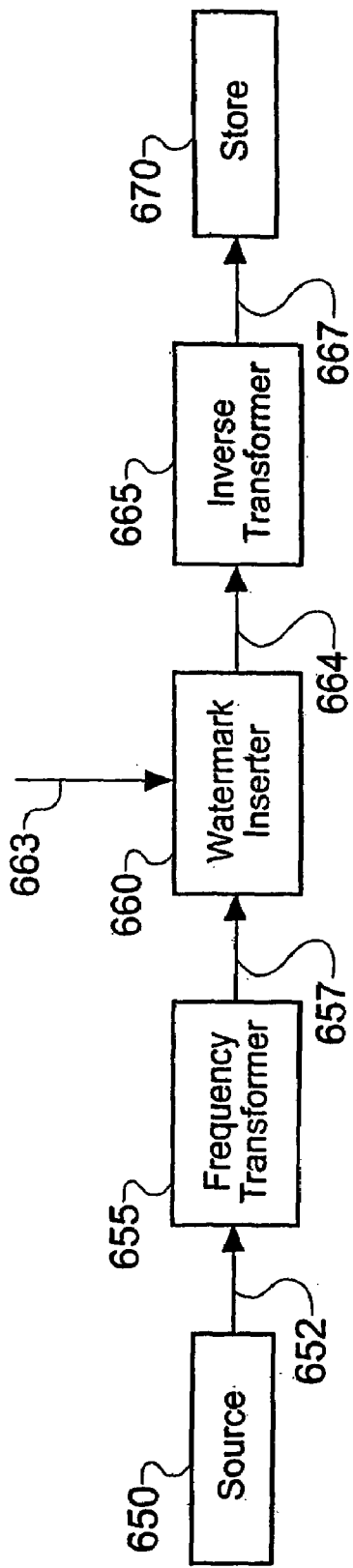

Watermarking—FIGS. 3 and 4

There is an ever increasing amount of information, and particularly video, being recorded, stored and distributed digitally. The ease with which this information may be duplicated is a concern, since any copyrights in the underlying works may potentially be easily infringed by unauthorised copying. Accordingly, copyright owners may be unwilling to make available and distribute their works without adequate protection against copying, or without being able to demonstrate that a particular example of work originates from them and may be an infringing unauthorised copy.

One possible technique which seeks to provide a solution to this problem is digital watermarking. Digital watermarking allows a code to be embedded in a digital work which contains information which may, for example, identify the owner, the distributor and/or an authorisation code. The digital watermark may be used in conjunction with other deterrents such as encryption.

The digital watermark, hereinafter referred to as the watermark, should be unique such that it, for example, unambiguously identifies the owner, the distributor and/or provides an authorisation code, a technique often referred to a fingerprinting. Also, the watermark may itself be a digital work such as an image, audio or video. The watermark may also contain an indication of whether the work may be copied freely, not copied at all or copied a predetermined number of times.

Preferably, the watermark should be undetectable, unalterable and non-removable by unauthorised individuals. Also, the watermark should not adversely degrade the underlying work in a manner that is readily perceptible. However, the watermark should be readily discernible by authorised individuals such that the owner and/or distributor may be identified.

The watermark should be easily embedded into the underlying digital work. Preferably, the embedding technique should be such that that this can be easily performed during recording, thereby watermarking the work at source, and thus minimising the possibility of any non-watermarked works being available.

The watermark may be robust such that it may not be removed or degraded by individuals seeking to make unauthorised copies. Unauthorised attempts to remove the robust watermark should result in severe degradation of the data, rendering the data useless. Situations where the data contains much redundant information, such as in video, may render the robust watermark susceptible to attack by, for example, frame dropping or the like. Hence, the robust watermark should preferably withstand such attacks and may, for example, change from frame to frame and may utilise any error correction/recovery techniques which are applied to data.

Alternatively, the watermark may be fragile such that it is damaged should an unauthorised copy be made.

However, the watermark should also preferably be reversible and removable by the owner, if required. Removal may be particularly useful during, for example, a post-production stage to reduce any cumulative effects of the watermark on the underlying work. Also, where information from different sources are edited together it may be desired that a different watermark is applied to the edited product.

End-user equipment may be configured to recognise the watermark such that it will not allow copying of protected works. Alternatively, the equipment may be configured such that it will only play works originating from a particular owner, distributed through a particular distributor or where the work contains a particular authorisation code.

The watermark may be extracted by comparing watermarked with non-watermarked data and its authenticity established.

Two techniques for embedding a watermark within the data fields of a digital work will now be described in more detail. The first is to embed the watermark in the spatial domain, the second is to embed the watermark in the frequency domain Spatial Domain Watermarks The process, in overview, involves altering predetermined data bits with the bits of a watermark to produce watermarked data. The existence of a watermark may be determined by performing the reverse operation on the watermarked data.

One approach is to embed a watermark by substituting insignificant bits of pseudo-randomly selected data with bits representing the watermark. However, these watermarks are susceptible to destruction by processing the least significant bits of the data. Another is to insert geometric patterns into the data which represent a watermark. However, these watermarks are susceptible destruction by geometric processing of the data. A further approach is to embed a watermark in a manner which resembles quantisation noise as described with reference to FIG. 3 below and more fully described in articles titled "Embedding Secret Information into a Dithered Multi-Level Image" by K Tanaka et al, IEEE Military Communications Conference pages 216–220, 1990 and "Video Steganography" by K Mitsui, IMA Intellectual Property Proceedings, volume 1, pages 187–296, 1994. However, these watermarks are susceptible to destruction by signal processing, particularly by requantisation of the data.

Referring now to FIG. 3, a source 650 produces a digital data signal 652, such as digital video. A watermark inserter 700 is couple to the source 650 and receives the digital data signal 652. The watermark inserter 700 applies the watermark 663 by applying the watermark to the digital data signal 652 in a manner that resembles requantisation noise to produce watermarked data 705. A storage device 670 is coupled to the watermark inserter 700 and stores the watermarked data 705.

A yet further approach is to randomly select n pairs of image points $(a_i, b_i)$ and increase the brightness of $a_i$ by one while decreasing the brightness of $b_i$ by one. Assuming certain statistical properties of the image are satisfied, the sum of the differences of the n pairs of points will be 2n.

Alternatively, where the data signal comprises at least two components (for example [Y, UV] according to MPEG, PAL or NTC), the watermark may be embedded by assigning values to these components which, in combination, do not usually occur. Also, where a watermark is to be embedded in, for example, video data containing two image fields, a positive watermark may be placed into the first field and a negative watermark into the second field. When watermarked image fields are played there is a masking effect due to the interlacing of the fields and the visual perception of the watermark is significantly reduced.

Frequency Domain Watermarks

The process, in overview, involves obtaining a frequency spectral image of the data to which the watermark is to be applied. The watermark is embedded into predetermined components of the of the frequency spectral image. Thereafter, the watermarked frequency spectral image is subjected to an inverse transform to produce watermarked data. The watermark may be extracted by performing the reverse operation on the watermarked data.

One approach is to partition the data into blocks and compute the Discrete Cosine Transform (DCT) of each of these blocks. Thereafter, the predetermined frequency coefficients of the blocks may be adjusted. A pseudo random subset of blocks may be chosen and in each such block coefficients of predetermined subset of frequencies adjusted such that their relative values encode a data bit. The variance in the relative values and the selection of the predetermined subset of frequencies should be such that the watermark is not perceptible. However, this watermark may be sensitive to damage by noise or further processing.

Alternatively, the watermark may be encoded by adjusting every frequency coefficient by a smaller amount as described with reference to FIG. 4 below and more fully described in EP-A-0 766 468. This has the advantage of making the watermark less sensitive to damage, but increases overall noise levels.

Referring now to FIG. 4, a source 650 produces a digital data signal 652, such as digital video. A frequency transformer 655 is coupled to the source 650 and receives the digital data signal 652. The frequency transformer 655 transforms the digital data signal 652 into frequency spectral data 657 using, for example, Discrete Cosine Transforms or Fast Fourier Transform techniques. A watermark inserter 660 is couple to the frequency transformer and receives the frequency spectral data 657. The watermark inserter applies the watermark 663 by adjusting each coefficient of the frequency spectral data 657 to produce watermarked frequency spectral data 663. An inverse frequency transformer 665 is coupled to the watermark inserter 660 and receives the watermarked frequency spectral data 663. The inverse frequency transformer 665 converts the watermarked frequency spectral data 663 into watermarked data 667. A storage device 670 is coupled to the inverse frequency transformer 665 and stores the watermarked data 667.

A further approach is to increase the changes to coefficients in particular frequencies by exploiting the existence of so-called masking phenomena in the human visual and auditory systems. Masking occurs when certain regions of data are occluded by perceptually more prominent regions elsewhere in the data. However, these regions need to be identified prior to inserting the watermark which increases the embedding complexity.

A yet further approach is to compress the digital data and embed the watermark into the x and y co-ordinates of motion vectors of the compressed data. This has the advantage of the watermark being embedded after compression and, hence, is more robust to processing.

Watermark References

The following are incorporated by reference.

Published Articles

"On the limits of steganography", IEEE Journal on Selected Areas in Communications (J-SAC), Special Issue on Copyright & Privacy Protection, vol. 16 no. 4, pp 474–481, May 1998.

"Embedding Robust Labels into Images for Copyright Protection", XP 000571967, 1995.

"Robust Watermarking of Still Images for Copyright Protection", XP 002118119, 1997.

"Secure Spread Spectrum Watermarking for Images, Audio and Video" IEEE International Conference on Image Processing (ICIP'96), Vol. 111, pp. 243–246, 1996.

"Object-based Transparent Video Watermarking", Electronic Proceedings of the IEEE Signal Processing Society 1997, Workshop on Multimedia Signal Processing, June 1997.

"Watermarking Methods for MPEG Encoded Video: Towards Resolving Rightful Ownership", Technical Report, University of Illinois at Urbana-Champaign, Number UIUCDCS-R-97–2032, December 1997.

"Multimedia Security and Copyright Protection", Technical Report, University of Illinois at Urbana-Champaign, Number UIUCDCS-R-98–2058, September 1998. (Abstract only)

Patent Applications

EP-A-0 766 468 "Method and System for Inserting a Spread Spectrum Watermark into Multimedia Data", NEC, 1996.

WO 96/41468 "Method and Apparatus for Copy Protection for Various Recording Media Using a Video Fingerprint", Macrovision, 1995.

EP-A-0 562 787 "Image Coding Method and Apparatus", Canon, 1993.

U.S. Pat. No. 5,960,081 "Embedding a Digital Signature in a Video Sequence", Cray Research, 1999.

WO 99/63443 "Methods for Embedding Image, Audio and Video Watermarks in Digital Data", Datamark Technologies, 1998.

WO 99/22480 "Watermarking of Digital Image Data", Columbia University, 1998.

WO 99/48290 "Copy Protection Schemes for Copy Protection Digital Material", Philips, 1999.

WO 99/18723 "Method and Apparatus for a Copy-Once Watermark for Video Recording", Digmarc, 1998.

WO 98/37513 "Invisible Digital Watermarks", Telstra, 1998.

WO 97/2206 "Marking a Video and/or Audio Signal", Philips, 1996.

JP 11-098341 "Electronic Watermark Superimposing Device and Electronic Watermark Detecting Device", Pioneer, 1997.

U.S. Pat. No. 5,889,868 "Optimisation Methods for the Insertion, Protection, and Detection of Digital Watermarks in the Digitized Data", The Dice Company, 1996.

U.S. Pat. No. 5,949,885 "Method for Protecting Content Using Watermarking", 1997.

U.S. Pat. No. 5,664,018 "Watermarking Process Resilient to Collusion Attacks", 1996.

U.S. Pat. No. 6,021,196 "Reference Palette Embedding", Regents University, 1998.

U.S. Pat. No. 5,991,426 "Field-based Watermark Insertion and Detection", Signafy, 199

U.S. Pat. No. 5,905,800 "Method and System for Digital Watermarking", The Dice Company, 1999.

U.S. Pat. No. 5,809,139 "Watermarking Method and Apparatus for Compressed Digital Video", Vivo Software, 1998.

U.S. Pat. No. 5,915,027 "Digital Watermarking", NEC, 1999.

U.S. Pat. No. 6,031,914 "Method and Apparatus for Embedding Data, Including Watermarks, in Human Perceptible Images", University of Minnesota, 2000.

U.S. Pat. No. 5,745,604 "Identification/Authentication System using Robust, Distributed Coding", Digimarc, 1998.

Figure 5:
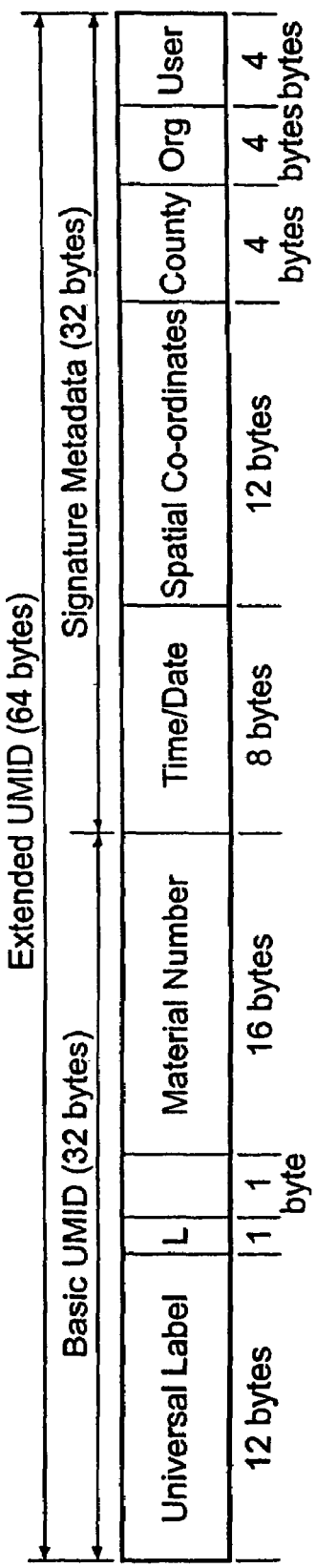
FIGS. 5 and 6 show data structures of material identifiers.
Figure 6:
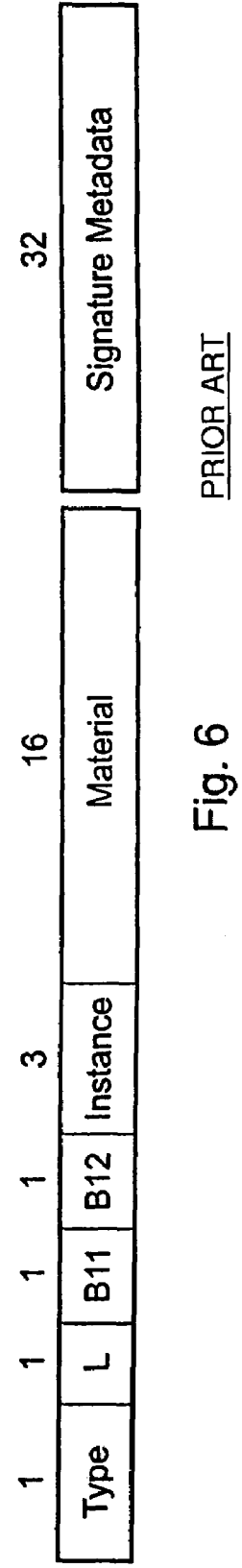

UMIDs:—FIGS. 5 and 6

A UMID is described in reference [2]. Referring to FIG. 5, a so-called extended UMID is shown. It comprises a first set of 32 bytes of basic UMID and a second set of 32 bytes of signature metadata.

The first set of 32 bytes is the basic UMID. The components are:

A 12-byte Universal Label to identify this as a SMPTE UMID. It defines the type of material which the UMID identifies and also defines the methods by which the globally unique Material and locally unique Instance numbers are created.

A 1-byte length value to define the length of the remaining part of the UMID.

A 3-byte Instance number which is used to distinguish between different 'instances' of material with the same Material number.

A 16-byte Material number which is used to identify each clip. Each Material number is the same for related instances of the same material.

The second set of 32 bytes of the signature metadata as a set of packed metadata items used to create an extended UMID. The extended UMID comprises the basic UMID followed immediately by signature metadata which comprises:

An 8-byte time/date code identifying the time and date of the Content Unit creation.

A 12-byte value which defines the spatial co-ordinates at the time of Content Unit creation.

3 groups of 4-byte codes which register the country, organisation and user codes Each component of the basic and extended UMIDs will now be defined in turn.

The 12-byte Universal Label

The first 12 bytes of the UMID provide identification of the UMID by the registered string value defined in table 1.

| Byte No. | Description | Value (hex) |
| --- | --- | --- |
| 1 | Object Identifier | 06h |
| 2 | Label size | 0Ch |
| 3 | Designation: ISO | 2Bh |
| 4 | Designation: SMPTE | 34h |
| 5 | Registry: Dictionaries | 01h |
| 6 | Registry: Metadata Dictionaries | 01h |
| 7 | Standard: Dictionary Number | 01h |
| 8 | Version number | 01h |
| 9 | Class: Identification and location | 01h |
| 10 | Sub-class: Globally Unique Identifiers | 01h |
| 11 | Type: UMID (Picture, Audio, Data, Group) | 01, 02, 03, 04h |
| 12 | Type: Number creation method | XXh |

Table 1: Specification of the UMID Universal Label

The hex values in Table 1 may be changed; the values given are examples. Also the bytes 1–12 may have designations other than those shown by way of example in the table. Referring to Table 1, in the example shown byte 4 indicates that bytes 5–12 relate to a data format agreed by SMPTE. Byte 5 indicates that bytes 6 to 10 relate to "dictionary" data. Byte 6 indicates that such data is "metadata" defined by bytes 7 to 10. Byte 7 indicates the part of the dictionary containing metadata defined by bytes 9 and 10. Byte 10 indicates the version of the dictionary. Byte 9 indicates the class of data and Byte 10 indicates a particular item in the class.

In the present embodiment bytes 1 to 10 have fixed pre-assigned values. Byte 11 is variable. Thus referring to FIG. 6, and to Table 1 above, it will be noted that the bytes 1 to 10 of the label of the UMID are fixed. Therefore they may be replaced by a 1 byte 'Type' code T representing the bytes 1 to 10. The type code T is followed by a length code L. That is followed by 2 bytes, one of which is byte 11 of Table 1 and the other of which is byte 12 of Table 1, an instance number (3 bytes) and a material number (16 bytes). Optionally the material number may be followed by the signature metadata of the extended UMID and/or other metadata.

The UMID type (byte 11) has 4 separate values to identify each of 4 different data types as follows:

'01h'=UMID for Picture material

'02h'=UMID for Audio material

'03h'=UMID for Data material

'04h'=UMID for Group material (i.e. a combination of related essence).

The last (12th) byte of the 12 byte label identifies the methods by which the material and instance numbers are created. This byte is divided into top and bottom nibbles where the top nibble defines the method of Material number creation and the bottom nibble defines the method of Instance number creation.

Length

The Length is a 1-byte number with the value '13h' for basic UMIDs and '33h' for extended UMIDs.

Instance Number

The Instance number is a unique 3-byte number which is created by one of several means defined by the standard. It provides the link between a particular 'instance' of a clip and externally associated metadata. Without this instance number, all material could be linked to any instance of the material and its associated metadata.

The creation of a new clip requires the creation of a new Material number together with a zero Instance number. Therefore, a non-zero Instance number indicates that the associated clip is not the source material. An Instance number is primarily used to identify associated metadata related to any particular instance of a clip.

Material Number

The 16-byte Material number is a non-zero number created by one of several means identified in the standard. The number is dependent on a 6-byte registered port ID number, time and a random number generator.

Signature Metadata

Any component from the signature metadata may be null-filled where no meaningful value can be entered. Any null-filled component is wholly null-filled to clearly indicate a downstream decoder that the component is not valid.

The Time-Date Format

The date-time format is 8 bytes where the first 4 bytes are a UTC (Universal Time Code) based time component. The time is defined either by an AES3 32-bit audio sample clock or SMPTE 12M depending on the essence type.

The second 4 bytes define the date based on the Modified Julian Data (MJD) as defined in SMPTE 309M. This counts up to 999,999 days after midnight on the 17th Nov. 1858 and allows dates to the year 4597.

The Spatial Co-Ordinate Format

The spatial co-ordinate value consists of three components defined as follows:

Altitude: 8 decimal numbers specifying up to 99,999,999 metres.

Longitude: 8 decimal numbers specifying East/West 180.00000 degrees (5 decimal places active).

Latitude: 8 decimal numbers specifying North/South 90.00000 degrees (5 decimal places active).

The Altitude value is expressed as a value in metres from the centre of the earth thus allowing altitudes below the sea level.

It should be noted that although spatial co-ordinates are static for most clips, this is not true for all cases. Material captured from a moving source such as a camera mounted on a vehicle may show changing spatial co-ordinate values.

Country Code

The Country code is an abbreviated 4-byte alpha-numeric string according to the set defined in ISO 3166. Countries which are not registered can obtain a registered alpha-numeric string from the SMPTE Registration Authority.

Organisation Code

The Organisation code is an abbreviated 4-byte alpha-numeric string registered with SMPTE. Organisation codes have meaning only in relation to their registered Country code so that Organisation codes can have the same value in different countries.

User Code

The User code is a 4-byte alpha-numeric string assigned locally by each organisation and is not globally registered. User codes are defined in relation to their registered Organisation and Country codes so that User codes may have the same value in different organisations and countries.

Freelance Operators

Freelance operators may use their country of domicile for the country code and use the Organisation and User codes concatenated to e.g. an 8 byte code which can be registered with SMPTE. These freelance codes may start with the '~' symbol (ISO 8859 character number 7Eh) and followed by a registered 7 digit alphanumeric string.

It will be noted from the foregoing discussion that a UMID may be used to identify not only video material, but also audio material, data material, and a group of material.

Figure 7:
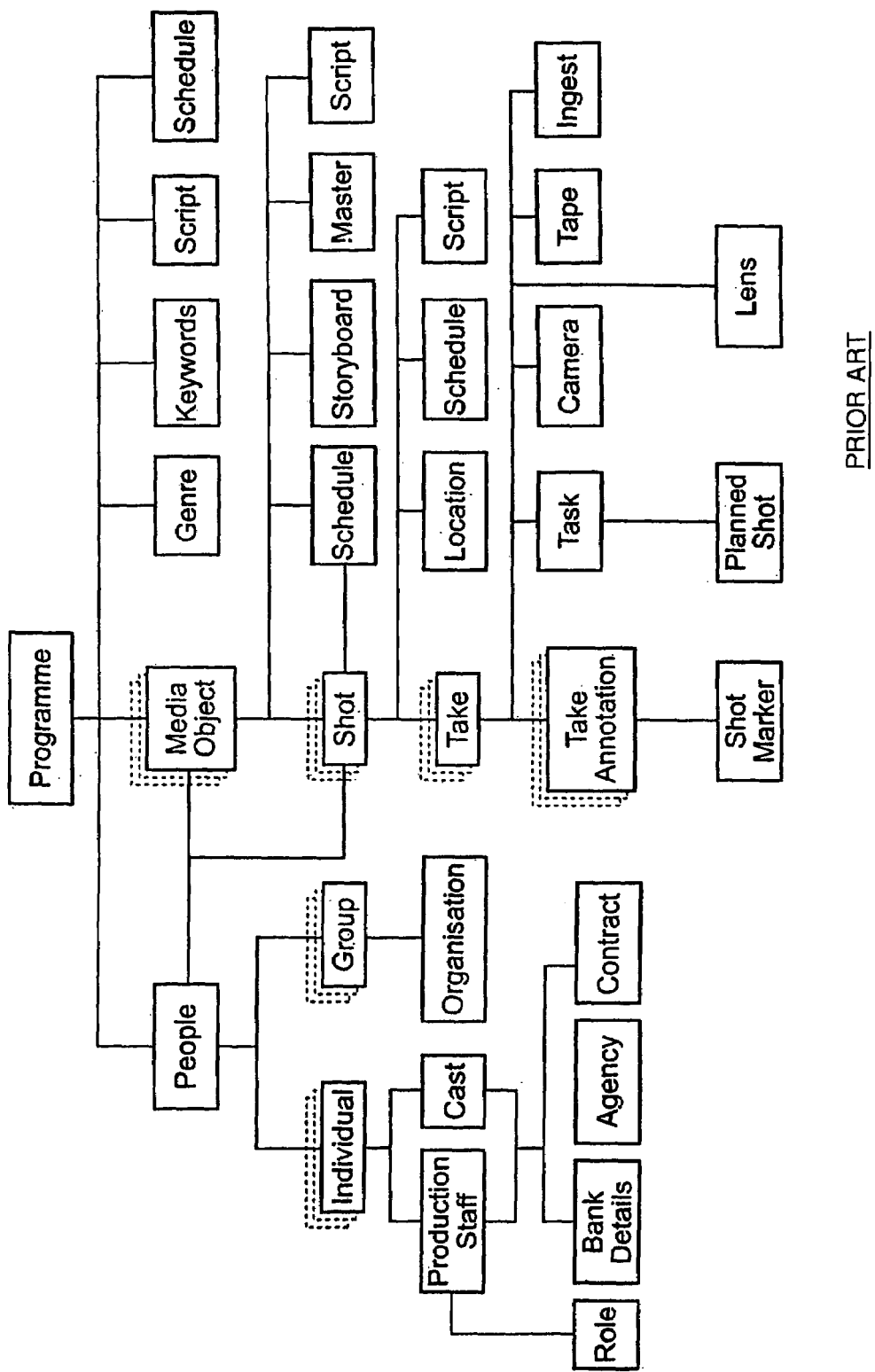
FIG. 7 illustrates an illustrative data structure in a metadata base.

Metadata—FIG. 7

The following is provided, by way of example, to illustrate the possible types of metadata generated during the production of a programme, and one possible organisational approach to structuring that metadata.

FIG. 7 schematically illustrates an example structure for organising metadata. A number of tables each comprising a number of fields containing metadata are provided. The tables may be associated with each other by way of common fields within the respective tables, thereby providing a relational structure. Also, the structure may comprise a number of instances of the same table to represent multiple instances of the object that the table may represent. The fields may be formatted in a predetermined manner. The size of the fields may also be predetermined. Example sizes include "Int" which represents 2 bytes, "Long Int" which represents 4 bytes and "Double" which represents 8 bytes. Alternatively, the size of the fields may be defined with reference to the number of characters to be held within the field such as, for example, 8, 10, 16, 32, 128, and 255 characters.

Turning to the structure in more detail, there is provided a Programme Table. The Programme Table comprises a number of fields including Programme ID (PID), Title, Working Title, Genre ID, Synopsis, Aspect Ratio, Director ID and Picture Stamp. Associated with the Programme Table is a Genre Table, a Keywords Table, a Script Table, a People Table, a Schedule Table and a plurality of Media Object Tables.

The Genre Table comprises a number of fields including Genre ID, which is associated with the Genre ID field of the Programme Table, and Genre Description.

The Keywords Table comprises a number of fields including Programme ID, which is associated with the Programme ID field of the Programme Table, Keyword ID and Keyword.

The Script Table comprises a number of fields including Script ID, Script Name, Script Type, Document Format, Path, Creation Date, Original Author, Version, Last Modified, Modified By, PID associated with Programme ID and Notes. The People Table comprises a number of fields including Image.

The People Table is associated with a number of Individual Tables and a number of Group Tables. Each Individual Table comprises a number of fields including Image. Each Group Table comprises a number of fields including Image. Each Individual Table is associated with either a Production Staff Table or a Cast Table.

The Production Staff Table comprises a number of fields including Production Staff ID, Surname, Firstname, Contract ID, Agent, Agency ID, E-mail, Address, Phone Number, Role ID, Notes, Allergies, DOB, National Insurance Number and Bank ID and Picture Stamp.

The Cast Table comprises a number of fields including Cast ID, Surname, Firstname, Character Name, Contract ID, Agent, Agency ID, Equity Number, E-mail, Address, Phone Number, DOB and Bank ID and Picture Stamp. Associated with the Production Staff Table and Cast Table are a Bank Details Table and an Agency Table.

The Bank Details Table comprises a number of fields including Bank ID, which is associated with the Bank ID field of the Production Staff Table and the Bank ID field of the Cast Table, Sort Code, Account Number and Account Name.

The Agency Table comprises a number of fields including Agency ID, which is associated with the Agency ID field of the Production Staff Table and the Agency ID field of the Cast Table, Name, Address, Phone Number, Web Site and E-mail and a Picture Stamp. Also associated with the Production Staff Table is a Role Table.

The Role Table comprises a number of fields including Role ID, which is associated with the Role ID field of the Production Staff Table, Function and Notes and a Picture Stamp. Each Group Table is associated with an Organisation Table.

The Organisation Table comprises a number fields including Organisation ID, Name, Type, Address, Contract ID, Contact Name, Contact Phone Number and Web Site and a Picture Stamp.

Each Media Object Table comprises a number of fields including Media Object ID, Name, Description, Picture Stamp, PID, Format, schedule ID, script ID and Master ID. Associated with each Media Object Table is the People Table, a Master Table, a Schedule Table, a Storyboard Table, a script table and a number of Shot Tables.

The Master Table comprises a number of fields including Master ID, which is associated with the Master ID field of the Media Object Table, Title, Basic UMID, EDL ID, Tape ID and Duration and a Picture Stamp.

The Schedule Table comprises a number of fields including Schedule ID, Schedule Name, Document Format, Path, Creation Date, Original Author, Start Date, End Date, Version, Last Modified, Modified By and Notes and PID which is associated with the programme ID.

The contract table contains: a contract ID which is associated with the contract ID of the Production staff, cast, and organisation tables; commencement date, rate, job title, expiry date and details.

The Storyboard Table comprises a number of fields including Storyboard ID, which is associated with the Storyboard ID of the shot Table, Description, Author, Path and Media ID.

Each Shot Table comprises a number of fields including Shot ID, PID, Media ID, Title, Location ID, Notes, Picture Stamp, script ID, schedule ID, and description. Associated with each Shot Table is the People Table, the Schedule Table, script table, a Location Table and a number of Take Tables.

The Location Table comprises a number of fields including Location ID, which is associated with the Location ID field of the Shot Table, GPS, Address, Description, Name, Cost Per Hour, Directions, Contact Name, Contact Address and Contact Phone Number and a Picture Stamp.

Each Take Table comprises a number of fields including Basic UMID, Take Number, Shot ID, Media ID, Timecode IN, Timecode OUT, Sign Metadata, Tape ID, Camera ID, Head Hours, Videographer, IN Stamp, OUT Stamp. Lens ID, AUTOID ingest ID and Notes. Associated with each Take Table is a Tape Table, a Task Table, a Camera Table, a lens table, an ingest table and a number of Take Annotation Tables.

The Ingest table contains an Ingest ID which is associated with the Ingest Id in the take table and a description.

The Tape Table comprises a number of fields including Tape ID, which is associated with the Tape ID field of the Take Table, PID, Format, Max Duration, First Usage, Max Erasures, Current Erasure, ETA (estimated time of arrival) and Last Erasure Date and a Picture Stamp.

The Task Table comprises a number of fields including Task ID, PID, Media ID, Shot ID, which are associated with the Media ID and Shot ID fields respectively of the Take Table, Title, Task Notes, Distribution List and CC List. Associated with the Task Table is a Planned Shot Table.

The Planned Shot Table comprises a number of fields including Planned Shot ID, PID, Media ID, Shot ID, which are associated with the PID, Media ID and Shot ID respectively of the Task Table, Director, Shot Title, Location, Notes, Description, Videographer, Due date, Programme title, media title Aspect Ratio and Format.

The Camera Table comprises a number of fields including Camera ID, which is associated with the Camera ID field of the Take Table, Manufacturer, Model, Format, Serial Number, Head Hours, Lens ID, Notes, Contact Name, Contact Address and Contact Phone Number and a Picture Stamp.

The Lens Table comprises a number of fields including Lens ID, which is associated with the Lens ID field of the Take Table, Manufacturer, Model, Serial Number, Contact Name, Contact Address and Contact Phone Number and a Picture Stamp.

Each Take Annotation Table comprises a number of fields including Take Annotation ID, Basic UMID, Timecode, Shutter Speed, Iris, Zoom, Gamma, Shot Marker ID, Filter Wheel, Detail and Gain. Associated with each Take Annotation Table is a Shot Marker Table.

The Shot Marker Table comprises a number of fields including Shot Marker ID, which is associated with the Shot Marker ID of the Take Annotation Table, and Description.

Whilst the foregoing description illustrates the invention by reference to video material, the invention may be applied to any one or more of video material, audio material and data material.

UMIDs are long e.g. 32 or 64 bytes. The watermark may contain another shorter identifier which is related to a UMID stored in the database. Thus the code on which the watermark is based may indirectly identify the material.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of storing data material having a data replay order, said method comprising the steps of:
   (i) encoding metadata identifying said data material as a watermark in dummy data material associated with said data material to be stored; wherein said data material comprises at least video material and said dummy data material comprises dummy video material; and
   (ii) storing said data material and said dummy data material on a medium at a different position in said data replay order;
   wherein the watermarked dummy data material is interleaved with the video material.

2. A data storage medium for storing data material having a data replay order, the data material being stored according to the method of claim 1, wherein said stored data material is associated with dummy data material stored on said medium at a different position in said data replay order.

3. A medium according to claim 2, in which said data material and said dummy data material are stored at substantially contiguous positions in said data replay order.

4. A medium according to claim 3, said medium being a linear access medium.

5. A medium according to claim 4, said medium being a tape medium.

6. A medium according to claim 2, in which said metadata comprises at least a material identifying code.

7. A medium according to claim 6, in which said data material is stored as data groups, each said data group including a material identifying code associating that said data group with metadata having a corresponding material identifying code.

8. A medium according to claim 7, in which said data material comprises at least video material.

9. A medium according to claim 8, in which each said data group comprises data representing a video image.

10. A medium according to claim 2, said medium being a linear access medium.

11. A medium according to claim 10, said medium being a tape medium.

12. A medium according to claim 2, in which said dummy video material comprises one or more images bearing alpha-numerical characters relating to said data material.

13. A medium according to claim 12, in which said dummy video material comprises an outline display into which items of said metadata can be inserted.

14. A medium according to claim 2, in which said dummy video material comprises one or more video test patterns.

15. A Computer software program provided on a computer readable medium having program code for carrying out a method according to claim 1.

16. A storage medium for storing the computer software program according to claim 15.

17. A transmission medium for transmitting the computer software program according to claim 15.

18. Apparatus for storing data material having a data replay order, said apparatus comprising:
   (i) a metadata encoder to encode metadata identifying said data material as a watermark in dummy data material associated with said data material to be stored; wherein said data material comprises at least video material and said dummy data material comprises dummy video material; and
   (ii) a storage arrangement to store said data material and said dummy data material on a medium at a different position in said data replay order; wherein the watermarked dummy data material is interleaved with the video material.

19. A method for encoding metadata as a watermark, said metadata identifying video data material having a data replay order; said method comprising the steps of:
   encoding said metadata identifying said video data material as a watermark in said video data material and in dummy video material associated with said video data material; and
   storing said video data material and said dummy video material on a data carrier at different respective positions in said data replay order, so that said dummy video material is interleaved with the video data material;
   in which said watermark is encoded so as to be more perceptible in the dummy video material than in the video data material.

20. A method according to claim 19, in which the dummy video material is encoded with a watermark carrying a higher metadata payload per material sample than said watermark encoded with the video data material.

21. An apparatus for encoding metadata as a watermark, said metadata identifying video data material having a data replay order; said apparatus comprising:
- a metadata encoder for encoding said metadata identifying said video data material as said watermark in said video data material and in dummy video material associated with said video data material; and
- a data carrier for storing said video data material and said dummy video material on said data carrier at different respective positions in said data replay order, so that said dummy video material is interleaved with said video data material;
- in which said watermark is encoded so as to be more perceptible in the dummy video material than in the video data material.

22. The apparatus according to claim 21, in which the dummy video material is encoded with a watermark carrying a higher metadata payload per material sample than said watermark encoded with the video data material.

* * * * *